(12) United States Patent
Livingstone et al.

(10) Patent No.: US 12,517,814 B1
(45) Date of Patent: Jan. 6, 2026

(54) INTEGRATED MULTI-PLATFORM TEST VALIDATOR

(71) Applicant: Morgan Stanley Services Group Inc., New York, NY (US)

(72) Inventors: Vineta Livingstone, Iselin, NJ (US); Shivind Kaur, Mumbai (IN); Kavya P K, Bengalore (IN)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/211,641

(22) Filed: May 19, 2025

(51) Int. Cl.
　　*G06F 9/44* (2018.01)
　　*G06F 11/3668* (2025.01)
　　*G06F 11/3698* (2025.01)

(52) U.S. Cl.
　　CPC ...... *G06F 11/3688* (2013.01); *G06F 11/3696* (2013.01); *G06F 11/3698* (2025.01)

(58) Field of Classification Search
　　CPC ............. G06F 11/3688; G06F 11/3698; G06F 11/3696
　　See application file for complete search history.

(56) References Cited

U.S. PATENT DOCUMENTS

| | | |
|---|---|---|
| 8,788,885 B1 | 7/2014 | Cook et al. |
| 9,367,415 B1 | 6/2016 | Lachwani et al. |
| 10,073,553 B2 | 9/2018 | Chi et al. |
| 10,210,074 B1 | 2/2019 | Szerenyi |
| 10,936,477 B2 | 3/2021 | Fisher |
| 2002/0144233 A1 | 10/2002 | Chong et al. |
| 2006/0026506 A1 | 2/2006 | Kristiansen et al. |
| 2013/0227291 A1* | 8/2013 | Ahmed ............... H04L 63/0884 713/168 |
| 2014/0222930 A1* | 8/2014 | Gangadharan .......... H04L 51/04 709/206 |
| 2015/0363304 A1 | 12/2015 | Nagmalla et al. |
| 2016/0188450 A1* | 6/2016 | Appusamy .......... G06F 11/3688 714/38.1 |
| 2016/0219043 A1* | 7/2016 | Blanke .................. H04L 9/3263 |
| 2017/0039038 A1 | 2/2017 | Huber et al. |
| 2017/0300402 A1 | 10/2017 | Hoffner et al. |
| 2018/0253373 A1 | 9/2018 | Mathur |
| 2018/0275986 A1 | 9/2018 | Ghosh et al. |
| 2018/0322035 A1 | 11/2018 | Mohanty et al. |
| 2019/0303274 A1 | 10/2019 | Funnell et al. |
| 2020/0104241 A1* | 4/2020 | Talukdar ............. G06F 11/3684 |
| 2021/0117313 A1 | 4/2021 | Geary |
| 2021/0390011 A1 | 12/2021 | Cser et al. |
| 2021/0392144 A1 | 12/2021 | Vaidyanath et al. |
| 2022/0100639 A1 | 3/2022 | Weishaar et al. |
| 2022/0206929 A1 | 6/2022 | Rao et al. |
| 2022/0237483 A1 | 7/2022 | Mossler et al. |

(Continued)

*Primary Examiner* — Bradley A Teets
*Assistant Examiner* — Lenin Paulino
(74) *Attorney, Agent, or Firm* — HUNTON ANDREWS KURTH LLP

(57) ABSTRACT

Systems and methods for implementing an integrated multi-platform test validator are provided. An embodiment of the present invention is directed to integrating validations for applications supporting multiple platforms (e.g., desktop, mobile, etc.) in a single execution flow that streamlines testing and ensures consistent performance and user experience. Consolidating the testing efforts into single platform reduces complexity, increases efficiency and improves the overall quality coverage.

16 Claims, 4 Drawing Sheets

(56) References Cited

U.S. PATENT DOCUMENTS

| | | |
|---|---|---|
| 2022/0253376 A1 | 8/2022 | Shwarzman et al. |
| 2022/0365872 A1 | 11/2022 | Finkelstein et al. |
| 2022/0366448 A1 | 11/2022 | Doumar |
| 2023/0130027 A1 | 4/2023 | Mason |
| 2023/0195596 A1* | 6/2023 | Mazumdar .......... G06F 11/3433 717/131 |
| 2024/0362153 A1* | 10/2024 | Sriramdas ........... G06F 11/3692 |
| 2024/0419578 A1 | 12/2024 | Srivastava et al. |
| 2025/0117315 A1* | 4/2025 | Thomas .............. G06F 11/3698 |

* cited by examiner

410 — Feature: Online Scheduling – Test Cases for Mobile Scheduler Settings

| Steps 412 | Passed  Failed  Skipped  Pending  Undefined  Total |
| --- | --- |
| Scenarios 414 | Passed  Failed  Total |
| Features 416 | Duration  Status |

420 | Tags : @SchedulerSettings @MobileRFB

422 | Feature : Online Scheduling – Test Cases for Mobile Scheduler Settings

424 | Tags : @SchedulerSettings @MobileRFB @NewMeeting @ Mobile Test

426 | Scenario Outline 2 Verify Creation Meeting Location – Create Edit and Delete from Scheduler Settings 428 | Hooks 430 | Steps Web 432:
Given test data is read
Given login with user
And wait 2 seconds
And navigate to "scheduler settings" page
...

Mobile 434:
Given initialize mobile driver
When
Then
...

Web 436:
And click "edit"
...

Mobile 438:
Then navigate to "menu" page on mobile
...

INTEGRATED MULTI-PLATFORM TEST VALIDATOR

FIELD OF THE INVENTION

The present invention relates generally to implementing an integrated multi-platform test validator.

BACKGROUND

Software testing generally involves the process of evaluating and verifying a software application performs as expected. There may be differences in how software applications perform based on type of environment, operating systems as well as other specifics and limitations.

Existing solutions perform separate validations for mobile applications and desktop applications. These solutions lack validations of an end-to-end functioning of an application across multiple platforms with no focus on user experience.

Traditional application automation frameworks provide segregated instances of validating mobile or web applications. While corresponding functional flows may be identical, duplicate line of codes are incorporated as separate projects to achieve quality. This leads to increased development, complexities in maintenance and higher resource costs as well as inefficiencies and inconsistencies across platforms.

Accordingly, there is a need for an improved platform that enables integrated multi-platform test validations in an efficient and streamlined manner.

SUMMARY

Systems and methods for implementing an integrated multi-platform test validator are provided. An embodiment of the present invention seeks to integrate web and mobile driver setup under a single framework. This enables common code to be developed that identifies an application under test using configurations and identical code to handle verifications across cross platforms and devices.

According to an embodiment, a system for a multi-platform test validator comprises: a computer server comprising one or more processors; and non-transitory memory comprising instructions that, when executed by the one or more processors, cause the one or more processors to: receive an input for a test scenario wherein the input comprises at least one configuration file, test data and testing framework data; responsive to the input, determine a test scenario comprising a set of test cases and determine a test execution environment for at least a subset of the set of test cases; initiate a unified driver to receive the input and execute the set of test cases on an application under test through multiple test environments; establish a first secure communication using a real-time two-way communication protocol for a web browser environment; establish a second secure communication using a mobile protocol for a mobile environment; for each test case of the set of test cases, automatically execute a test case at the test execution environment wherein the test execution environment is one of: the web browser environment or the mobile environment; generate a reporting based at least in part on the at least one configuration file; and transmit, via a communication network, the reporting to a recipient.

According to another embodiment, a computer-implemented method comprises the steps of: receiving an input for a test scenario wherein the input comprises at least one configuration file, test data and testing framework data; responsive to the input, determining a test scenario comprising a set of test cases and determine a test execution environment for at least a subset of the set of test cases; initiating a unified driver to receive the input and execute the set of test cases on an application under test through multiple test environments; establishing a first secure communication using a real-time two-way communication protocol for a web browser environment; establishing a second secure communication using a mobile protocol for a mobile environment; for each test case of the set of test cases, automatically executing a test case at the test execution environment wherein the test execution environment is one of: the web browser environment or the mobile environment; generating a reporting based at least in part on the at least one configuration file; and transmitting, via a communication network, the reporting to a recipient.

These and other advantages will be described more fully in the following detailed description.

BRIEF DESCRIPTION OF THE DRAWINGS

In order to facilitate a fuller understanding of the invention, reference is made to the attached drawings. The drawings should not be construed as limiting the invention, but are intended only to illustrate different aspects and embodiments of the invention.

FIG. 4 is an exemplary user interface, according to an embodiment of the present invention.

DETAILED DESCRIPTION

Figure 1:
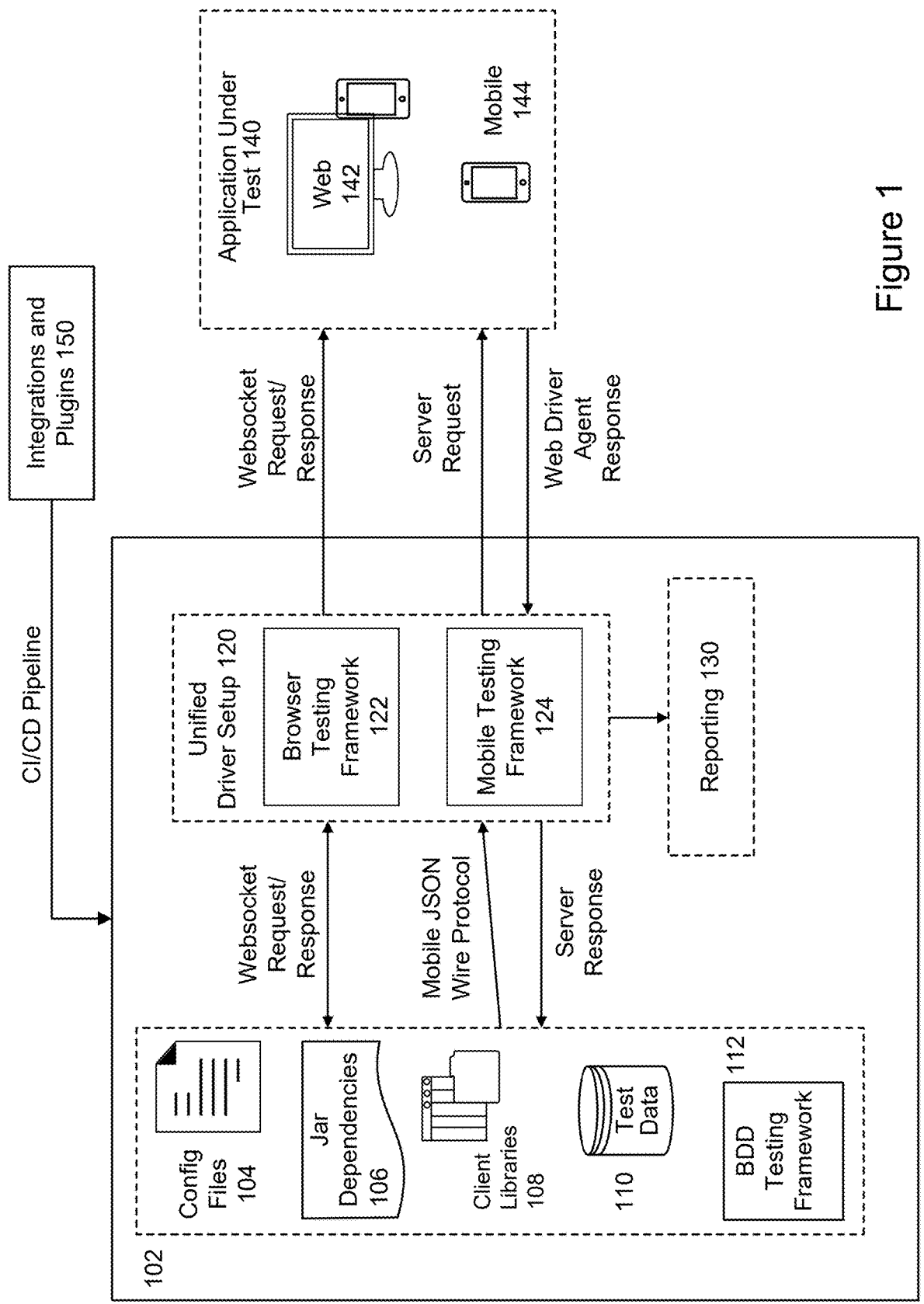
FIG. 1 is an exemplary architectural diagram, according to an embodiment of the present invention.

Exemplary embodiments of the invention will be described in order to illustrate various features of the invention. The embodiments described herein are not intended to be limiting as to the scope of the invention, but rather are intended to provide examples of the components, use, and operation of the invention.

An embodiment of the present invention is directed to integrating validations for applications supporting multiple platforms (e.g., desktop, mobile, etc.) in a single execution flow that streamlines testing and ensures consistent performance and user experience. Consolidating the testing efforts into single platform reduces complexity, increases efficiency and improves the overall quality coverage. The innovative validator assists in identifying platform specific issues and ensures application function correctly across various platforms and environments.

Leveraging the common code across mobile and web automations, an embodiment of the present invention brings down the lines of code thereby realizing efficiencies in development and maintenance efforts and further achieves shift left testing thereby reducing costs and realizing resource efficiencies. Shift left testing represents a software development approach that involves starting testing activities earlier in a development process to improve overall software quality and reduce costs, resources and time.

As functional flows across Desktop and Mobile platforms are substantially the same, maintaining different features from Behavior Driven Development (BDD) perspective causes duplicity and adds maintenance cost to the testing life cycle. An embodiment of the present invention consolidates implementations across platforms by segregating or routing specific requests to an applicable mode based on values specified at each step. This reduces code duplicity and facilitates maintainability with limited lines of code.

An embodiment of the present invention is directed to a framework that supports a low-code solution providing configurability and an intelligent way of automating cross platform test scenarios and identifying anomalies for cross platform applications. By integrating and consolidating code and scripts into a single unified framework, a set of coding standards and guidelines may be applied thereby significantly reducing or eliminating duplicate code and anomalies.

An embodiment of the present invention provides support for native/Hybrid mobile and desktop applications using a single codebase for different platform versions. Common code across mobile and device automation saves the development and maintenance efforts as well as Cross-Platform compatibility through unified test scripts that may be executed across different devices and operating systems. With an embodiment of the present invention, user interfaces and experiences across devices ensure consistent behavior and appearance. Support for responsive design testing ensures mobile and desktop versions adapt appropriately. Cloud based execution provides support for scalability across different real devices/emulators and simulators.

With an embodiment of the present invention, significant efficiencies may be realized through reduced script development as well as accuracy and consistency across platforms and an improved user experience. Additional benefits include a low-code solution, cross platform validations in a single flow reducing time to market; and reuseable consolidated scripts that reduce development and maintenance costs for automation.

FIG. 1 is an exemplary architectural diagram, according to an embodiment of the present invention. An embodiment of the present invention is directed to an orchestration layer that combines multiple solutions into an end-to-end validation across multiple platforms. This enables validation through a single workflow with minimal to no manual invention. With an embodiment of the present invention, a single script may be executed and validated across different devices, systems, environments, etc.

As shown in FIG. 1, Unified Driver Setup 120 may include Browser Testing Framework 122 and Mobile Testing Framework 124.

According to an embodiment of the present invention, Browser Testing Framework 122 may represent an automation library for browser testing 122 such as Playwright or other testing framework that establishes a driver for browser connectivity to mimic the user actions for web applications. In this example, Java represents the core language of a testing framework that executes an automated test process. Mobile Testing Framework 124 may represent an automation framework for mobile testing 124 such as Appium or other testing framework that establishes a driver for browser connectivity to mimic the user actions for web applications.

An embodiment of the present invention may support Cloud and Infrastructure configurations, such as JSON file setup for the application URLs, mobile packages and devices to allow muti-variant. An embodiment of the present invention is directed to integrating different databases (e.g., internal, external, cloud, etc.) or file formats (e.g., JSON, XML, xlsx, etc.) to enable end users to establish test data, an environment, application URLs, mobile application packages to enable no code implementation for validations. This enables non-technical users to leverage the framework without having to know specifics relating to the actual implementation. For example, users may interact through a user interface tool to build multi variant validations.

As shown in FIG. 1, Unified Driver Setup 120 may represent a Web and Mobile Engine/Driver that mimics user behavior on a desktop using a testing framework 122 and establishes scripts, via 124, for mobile devices via a secure connection with the browser 142 or mobile application 144. While a single device is shown for illustration purposes, multiple devices may be supported. In addition, the devices may or may not be the same and may operate on the same or different operating systems, environments, device specifics, etc.

An embodiment of the present invention may support Authentication and User Management including managing user logins via Single Sign-On (SSO), OAuth flow, etc. Other sequences of steps to obtain authorization and access may be supported.

As shown by 102, various inputs may interact with Unified Driver Setup 120. Inputs 102 may include Configuration Files 104, JAR Dependencies 106, Client Libraries 108, Test Data 110 and Behavior Driven Development (BDD) Testing Framework 112. Other inputs and integrations may be supported.

Configuration Files 104 may include text case parameters and other specifics. Configuration Files 104 may be provided by a user or automatically extracted from a source system.

An embodiment of the present invention may rely on reuseable methods that may be accessed at Client Libraries 108. Reusable methods may represent blocks of code designed to perform specific tasks that may be called multiple times from different parts of a program. This promotes code reusability, reduces redundancy, and improves code organization. By encapsulating a specific functionality within a reuseable method, developers may avoid writing the same code repeatedly. This makes the codebase more maintainable and efficient. Reuseable methods may relate to both a desktop environment as well as a mobile environment. Reuseable methods may include methods that support connecting to a desktop application, connecting to a mobile application, specific click operations, how the click operations are performed on the desktop application and mobile application, how elements are searched, various associated operations, etc. Accordingly, the reuseable methods may be stored in client libraries 108 and information regarding how those methods are supported or performed may be stored in JAR Dependencies 106.

JAR Dependencies 106 may represent a Java Archive (JAR) file that contains code or other resources including dependencies and other applications that may need to be executed. To communicate with drivers, an embodiment of the present invention may rely on JAR Dependencies 106 and Client Libraries 108.

Test Data Generation may involve creating synthetic data for use case validation where Test Data may be captured at 110.

An embodiment of the present invention may support Test Management and orchestration across multiple applications including device and mobile applications. For example, BDD Testing Framework 112 may support page object model (POM) generation and grouping of functional flows for use case validation and may further support organizing and controlling execution on different platforms through a single execution. For example, BDD Testing Framework may support local execution. In this example, BDD allows non-technical users to provide a logical flow of validations in a format with an Agile acceptance criteria or other specific conditions and further supports interactions with different stakeholders from many aspects of SDLC. This incorporation enables various individuals to leverage an embodiment of the present invention and further design end-to-end scenarios and validate applications across platforms without requiring core technical competencies. BDD Framework 112 may support behavior driven development and allow expected software behaviors to be specified via a logical language. BDD Framework 112 may support test scenarios, workflows, feature files, etc. This may include a format such as: Feature, Scenario, Given, When, Then, And. Other formats may be supported.

Reporting 130 may provide various types of reporting, analytics, interfaces and communications. For example, customized reports may include test report generation, evidence storage, visual representation of execution metrics on various platforms and notifications to stakeholders via emails and other forms of communication.

An embodiment of the present invention may support Integrations and Plugins 150. This allows parallel executions, deployments on CI/CD pipelines and integration with tools such as test management tools (e.g., Xray, Test Central, etc.) for collaboration and issue tracking. For example, CI/CD pipelines provide an ability to schedule execution/regression runs through project management tools.

An embodiment of the present invention may support communication protocols for Browser Testing Framework 122 and Mobile Testing Framework 124. In this example, Browser Testing Framework 122 may interact with a WebSocket API or other response structure where a connection may be open throughout a session for an application. As shown in FIG. 1, a WebSocket request may be sent to Browser Testing Framework 120, which may then relay a WebSocket request to web browser 142. A response may be sent back through Browser Testing Framework 122. For the WebSocket request and response, a session may remain open.

For Mobile Testing Framework 124, a request may be sent and a server may provide a response to check a connection. In this example, mobile JSON wire protocol may be implemented which sends a server request to the mobile device 144 and a web driver agent response may be returned. JSON wire protocol may define how a web driver communicates with browsers and servers using JSON over HTTP for automating web browser actions. For the JSON wire protocol, once a request is acknowledged and completed, the session will close.

Figure 2:
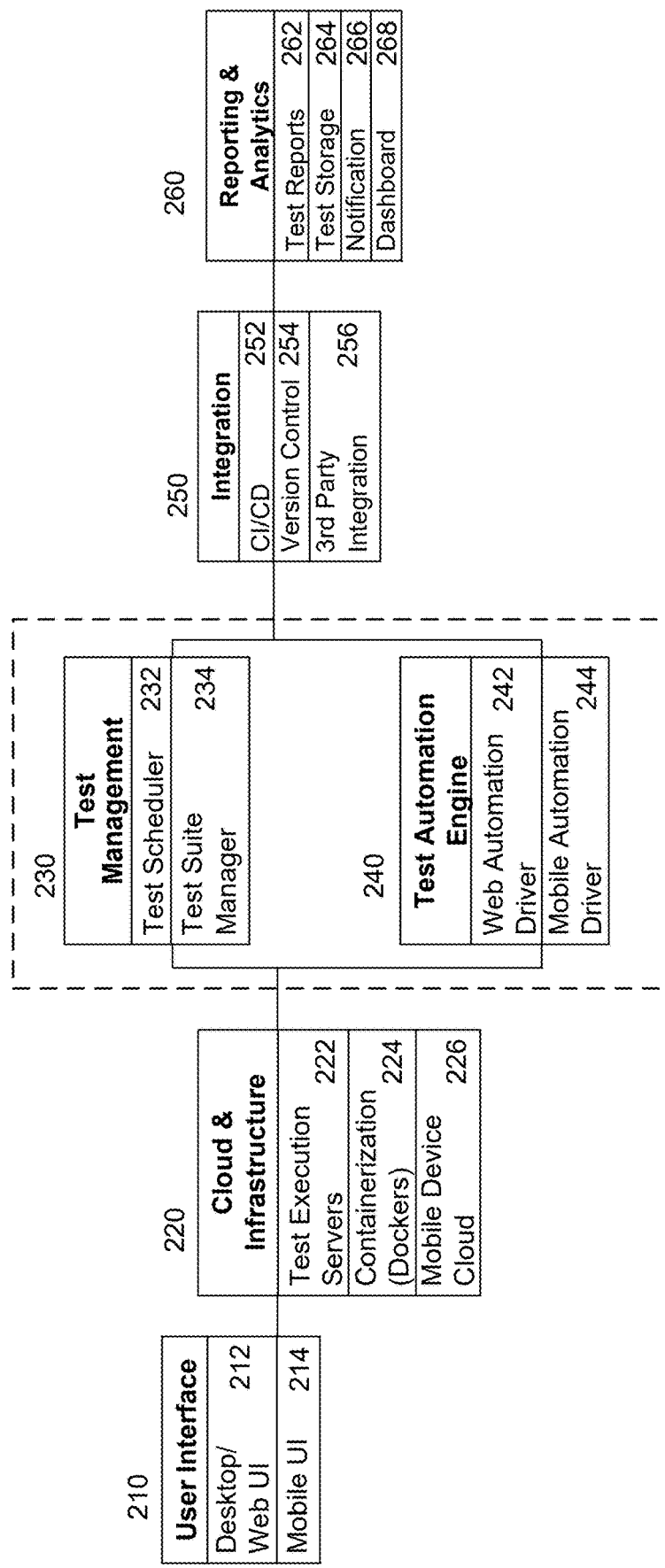
FIG. 2 is an exemplary system diagram, according to an embodiment of the present invention.

FIG. 2 is an exemplary system diagram, according to an embodiment of the present invention. The system diagram of FIG. 2 may include components such as User Interface 210, Cloud and Infrastructure 220, Test Management 230, Test Automation Engine 240, Integration 250 and Reporting and Analytics 260.

User Interface 210 may include Desktop/Web UI 212, Mobile UI 214. Other interfaces may be supported. Desktop/Web UI 212 may include an interface for users on a browser. Mobile UI 214 may include an interface for users on mobile devices (e.g., using mobile app or responsive design). In addition, multiple desktop and mobile devices may be supported. The devices may or may not be the same and may use the same or different operating systems, environments, protocols, etc. Other variations may be supported.

Cloud and Infrastructure 220 may include Test Execution Servers 222, Containerization and Virtualization 224 and Mobile Device Cloud 226.

Test Execution Servers 222 may represent machines (physical or virtual) responsible for executing the tests, typically distributed across multiple environments. Containerization and Virtualization 224 may represent Docker or Kubernetes (or other container platform) for managing isolated environments for tests. Mobile Device Cloud 226 may represent cloud-based services for running mobile tests on real devices.

Test Management 230 may orchestrate tests via Test Automation Engine 240, which triggers test execution on various platforms, such as web and mobile platforms.

Customized plugins may set-up the connection of browser initialization on web socket protocol and mobile driver on http protocol keeping the session alive at both platform ends.

Test Management 230 may include: Test Scheduler 232 and Test Suite Manager 234. Test Scheduler 232 may represent a build management and continuous integration/continuous delivery server that automates the process of building, testing and deployment software products. Test Suite Manager 234 may manage test cases, feature files, etc. Test Suite Manager 234 may represent a BDD Testing Framework.

Test Automation Engine 240 may include: Web Automation Driver 242 and Mobile Automation Driver 244. Test Automation Engine 240 may route requests to a web browser, a mobile device or other test environment.

Test Automation Engine 240 may provide support across multiple platforms. Web Automation Driver (e.g., Playwright) 242-connectivity to various browsers (e.g., Chrome, Firefox, Safari, Edge, etc.) managed through Playwright. Mobile Automation Driver (e.g., Appium) 244-connection established via Appium server and Selenium HTTP driver used for mimicking user actions.

Integration 250 may include: CI/CD 252, Version Control 254 and Third Party Integration 256.

CI/CD 252 may integrate with continuous integration/continuous deployment pipelines (e.g., Jenkins, Gitlab CI, etc.). Version Control 254 may integrate with version control systems (e.g., Github, Gitlab, Bitbucket, etc.). Version Control 254 provides for version controlling of applications to enable reuse/release across different departments, etc. Third Party Integration 256 may integrate with various tools (e.g., Slack, Jira, TestRail, etc.) for collaboration and issue tracking. Third Party Integration 256 enables the ability to receive inputs and provide results to various other systems, platforms, etc.

Reporting and Analytics 260 may include: Test Reports 262, Test Storage 264, Notification 266 and Dashboard 268.

Test Reports 262 may collect test results and generate detailed reports. Test Storage 264 may store results of executed tests, including logs, screenshots, videos, etc. Notification 266 may send alerts or notifications based on test results (e.g., failure alerts, summary reports, etc.) or other conditions. Dashboard 268 may provide a visual representation of test execution status, metrics, trends over a period of time, etc. Other user interfaces may be supported.

Figure 3:
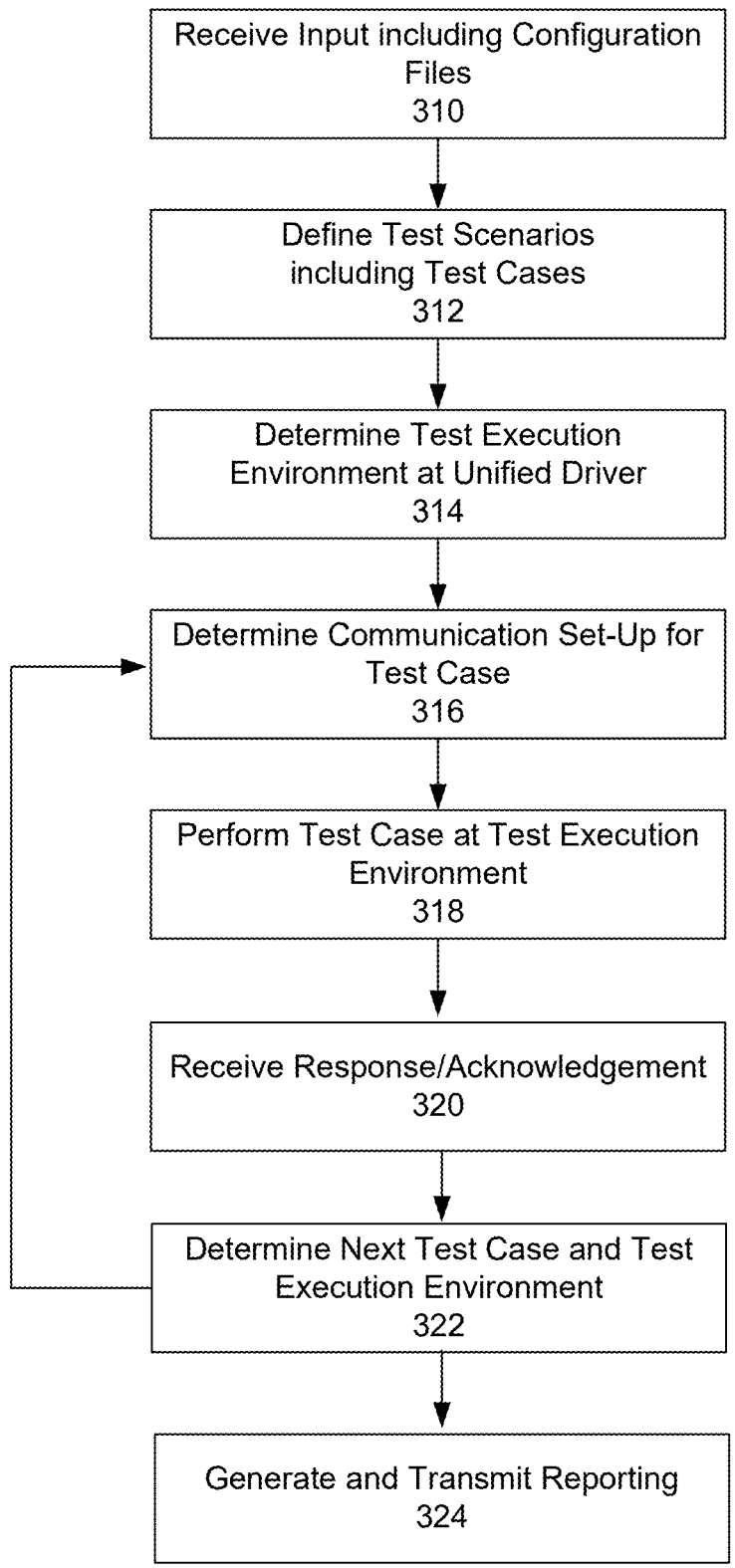
FIG. 3 is an exemplary flowchart, according to an embodiment of the present invention.

FIG. 3 is an exemplary flowchart, according to an embodiment of the present invention. At step 310, an input may be received. At step 312, a test scenario may be defined. At step 314, a unified driver may determine a test execution environment for the test scenario and test cases. At step 316, a communication set-up may be determined for a test case. At step 318, a test case may be performed at the test execution environment. At step 320, a response or acknowledgement may be received. At step 322, a next test case and test execution environment may be determined. At step 324, results may be reported and transmitted. While the process of FIG. 3 illustrates certain steps performed in a particular order, it should be understood that the embodiments of the present invention may be practiced by adding one or more steps to the processes, omitting steps within the processes and/or altering the order in which one or more steps are performed. Additional details for each step may be provided below.

At step 310, an input may be received. Input may also include configuration files (e.g., 104 in FIG. 1), Test Data (e.g., 110 in FIG. 1) and Feature Files (e.g., inputs to BDD Testing Framework 122). The configuration files and other inputs that identify what application to launch, identifiers (e.g., URLs), type of environment (e.g., mobile, desktop, other environment) and specifics (e.g., operating systems, etc.), reporting specifics, etc. Feature Files may include a list of steps that define navigation for an end-to-end scenario for a specific application.

Input may be received through various mechanisms including a user input, a data feed from an input server, etc. The input may include an intelligent data identification process based on artificial intelligence and may provide automatic integration with dependencies and/or other data. In addition, the input may be dynamically generated based on scenarios, etc.

At step 312, a test scenario may be defined. The test scenario may include a set of test cases. For example, an application may represent a payment application with a test scenario for a specific login function. The set of test cases may include: a step to navigate to a home page; a step to interact with a payment login icon, etc.

At step 314, a unified driver may determine a test execution environment for the test scenario and test cases. This may include specifics relating to a desktop environment, a mobile environment and/or other environment. The unified driver may determine whether a desktop environment is called and whether a mobile environment is called for a specific action of a test case.

At step 316, a communication set-up may be determined for a test case. The unified driver may access client libraries to establish communication protocols with an appropriate environment and further determine what test cases or steps to perform. For example, a desktop environment may require a different set-up than a mobile environment. A desktop environment may rely on WebSocket request and responses while a mobile environment may rely on a Mobile JSON wire protocol. The communication protocols may be established simultaneously, near-simultaneously, or concurrently. Other communication set-ups may be identified and supported.

At step 318, a test case may be performed at the test execution environment. This may involve: entering a username; entering a password and interacting with a submit button.

At step 320, a response or acknowledgement may be received. The response or acknowledgement may be received from an application under test, at the unified driver setup and then transmitted to client libraries to determine a next action or test case.

At step 322, a next test case and test execution environment may be determined. The text cases for a scenario may be executed and may cross environments as needed.

At step 324, results may be reported and transmitted. Reporting specifics may be provided at the configuration files. Other analytics and preferences may be applied.

FIG. 4 is an exemplary user interface, according to an embodiment of the present invention. FIG. 4 provides a feature report for a specific project. As shown by 410, a exemplary feature may include online scheduling-test cases for mobile scheduler settings. Results may include Steps 412, Scenarios 414, Features 416, etc. Steps results may include: Passed, Failed, Skipped, Pending, Undefined, Total. Scenarios results may include: Passed, Failed, Total. Features results may include: Duration and Status.

In this example, Tags are shown at 420 for Feature Online Scheduling-Test Cases for Mobile Scheduler Settings as shown by 422. Tags 424 may be shown for Scenario 426. Hooks 428 and Steps 430 are also provided. Hooks may represent a mechanism that allows developers to intercept and modify behavior of applications by injecting custom code at specific points in an execution process.

Steps may be shown in section 440 where the steps may execute on different environments as shown by Web portions and Mobile portions. In the example of FIG. 4, web portions 432 and 436 are shown between mobile portions 434 and 438. Additional testing environments may be supported.

The User Interface of FIG. 4 may interface and communicate with various users via a communication network. Other users and integrations may be supported.

The system components are exemplary and illustrative, an embodiment of the present invention may interact with additional modules, a combination of the modules described and/or less modules than illustrated. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

The illustrated system may be communicatively coupled to various Data Stores as well as remote storages. Data stores may also store and maintain source code, reports, performance data, historical data, etc. These storage components may include any suitable data structure to maintain the information and allow access and retrieval of the information. The storage may be local, remote, or a combination. The storage components may have back-up capability built-in. Communications with the storage components may be over a network or communications may involve a direct connection between the various storage components. The storage components may also represent cloud or other network based storage.

The system may be implemented in a variety of ways. Architecture within the system may be implemented as hardware components (e.g., module) within one or more network elements. It should also be appreciated that architecture within the system may be implemented in computer executable software (e.g., on a tangible, non-transitory computer-readable medium) located within one or more network elements. Module functionality of architecture within the system may be located on a single device or distributed across a plurality of devices including one or more centralized servers and one or more mobile units or end user devices. The architecture depicted in the system is meant to be exemplary and non-limiting. For example, while connections and relationships between the elements of system are depicted, it should be appreciated that other connections and relationships are possible. The system described may be used to implement the various methods herein, by way of example. Various elements of the system may be referenced in explaining the exemplary methods described herein.

Networks may be a wireless network, a wired network or any combination of wireless network and wired network.

Networks may further include one, or any number of the exemplary types of networks operating as a stand-alone network or in cooperation with each other. Networks may utilize one or more protocols of one or more network elements to which it is communicatively coupled. Networks may translate to or from other protocols to one or more protocols of network devices. Although Networks may be depicted as one network for simplicity, it should be appreciated that according to one or more embodiments, Networks may comprise a plurality of interconnected networks, such as, for example, a service provider network, the Internet, a cellular network, corporate networks, or even home networks, or any of the types of networks mentioned above.

Data may be transmitted and received via Networks utilizing a standard networking protocol or a standard telecommunications protocol. For example, data may be transmitted using protocols and systems suitable for transmitting and receiving data. Data may be transmitted and received wirelessly or in some cases may utilize cabled network or telecom connections or other wired network connection.

While the figures illustrate individual devices or components, it should be appreciated that there may be several of such devices to carry out the various exemplary embodiments. The system may communicate using any mobile or computing device, such as a laptop computer, a personal digital assistant, a smartphone, a smartwatch, smart glasses, other wearables or other computing devices capable of sending or receiving network signals. Computing devices may have an application installed that is associated with the illustrated system.

Those skilled in the art will appreciate that the diagrams discussed above are merely examples of a system and a method for implementing an integrated multi-platform test validator platform. Other types and configurations of networks, servers, databases and personal computing devices (e.g., desktop computers, tablet computers, mobile computing devices, smart phones, etc.) may be used with exemplary embodiments of the invention.

Although the foregoing examples show the various embodiments of the invention in one physical configuration, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. The components of the various embodiments may be arranged at any location or locations within a distributed network without affecting the operation of the respective system.

Although examples of servers, databases, and personal computing devices have been described above, exemplary embodiments of the invention may utilize other types of devices whereby a user may interact with a network that transmits and delivers data and information used by the various systems and methods described herein. These devices may further include an electronic memory such as a random access memory (RAM), electronically programmable read only memory (EPROM), other computer chip-based memory, a hard drive, or other magnetic, electrical, optical or other media, and other associated components connected over an electronic bus, as will be appreciated by persons skilled in the art.

In some embodiments, the computing devices may be equipped with an integral or connectable liquid crystal display (LCD), electroluminescent display, a light emitting diode (LED), organic light emitting diode (OLED) or another display screen, panel or device for viewing and manipulating files, data and other resources, for instance using a graphical user interface (GUI) or a command line interface (CLI). The personal computing devices may also include a network-enabled appliance or another TCP/IP client or other device.

The servers, databases, and personal computing devices described above may include at least one accelerated processing unit, such as a GPU or FPGA, and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software. The modules described above may comprise software stored in the memory (e.g., non-transitory computer readable medium containing program code instructions executed by the processor) for executing the methods described herein.

Any suitable programming language may be used in accordance with the various embodiments of the invention. For example, the programming language used may include assembly language, Ada, APL, Basic, C, C++, dBase, Forth, HTML, Android, IOS, .NET, Python, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

The software, hardware and services described herein may be provided utilizing one or more cloud service models, such as Software-as-a-Service (SaaS), Platform-as-a-Service (PaaS), Infrastructure-as-a-Service (IaaS), and Logging as a Service (LaaS), and/or using one or more deployment models such as public cloud, private cloud, hybrid cloud, and/or community cloud models.

In the system and method of exemplary embodiments of the invention, a variety of "user interfaces" may be utilized to allow a user to interface with the personal computing devices. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor.

Although the embodiments of the invention have been described herein in the context of a particular implementation in a particular environment for a particular purpose, those skilled in the art will recognize that its usefulness is not limited thereto and that the embodiments of the invention can be beneficially implemented in other related environments for similar purposes.

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents. The specification and drawings are accordingly to be regarded as an illustrative rather than restrictive sense.

What is claimed is:

1. A system for a multi-platform test validator comprising:
   a computer server comprising one or more processors; and
   non-transitory memory comprising instructions that, when executed by the one or more processors, cause the one or more processors to:
   receive an input for a test scenario wherein the input comprises at least one configuration file, test data and testing framework data;
   responsive to the input, determine a test scenario comprising a set of test cases and determine a test execution environment for at least a subset of the set of test cases;
   initiate a unified driver to receive the input and execute the set of test cases on an application under test through multiple test environments, wherein the unified driver integrates both a browser testing framework and a mobile testing framework to enable common code execution across platforms;
   establish a first secure communication using a real-time two-way communication protocol for a web browser environment comprising WebSockets wherein the first secure communication remains open after establishment;
   establish a second secure communication using a mobile protocol for a mobile environment comprising a mobile JSON wire protocol wherein the second secure communication closes following acknowledgment;
   wherein the first secure communication and the second secure communication are both established simultaneously;
   for each test case of the set of test cases, automatically execute a test case at the test execution environment wherein the test execution environment is one of: the web browser environment or the mobile environment;
   generate a reporting based at least in part on the at least one configuration file; and
   transmit, via a communication network, the reporting to a recipient.

2. The system of claim 1, wherein the unified driver comprises an integration of a browser testing framework and a mobile testing framework.

3. The system of claim 1, wherein the unified driver accesses client libraries and JAR dependencies to execute the set of test cases.

4. The system of claim 1, wherein the unified driver is integrated with a CI/CD pipeline.

5. The system of claim 1, wherein the testing framework data comprises Behavior-Driven Development (BDD) instructions.

6. The system of claim 1, wherein the reporting comprises feature status and performance.

7. The system of claim 1, wherein the unified driver is managed by a test scheduler.

8. The system of claim 1, wherein the unified driver operates with a test automation engine that routes requests to the test execution environment.

9. A computer-implemented multi-platform test validator method comprising the steps of:
   receiving an input for a test scenario wherein the input comprises at least one configuration file, test data and testing framework data;
   responsive to the input, determining a test scenario comprising a set of test cases and determine a test execution environment for at least a subset of the set of test cases;
   initiating a unified driver to receive the input and execute the set of test cases on an application under test through multiple test environments, wherein the unified driver integrates both a browser testing framework and a mobile testing framework to enable common code execution across platforms;
   establishing a first secure communication using a real-time two-way communication protocol for a web browser environment comprising WebSockets wherein the first secure communication remains open after establishment;
   establishing a second secure communication using a mobile protocol for a mobile environment comprising a mobile JSON wire protocol wherein the second secure communication closes following acknowledgment;
   wherein the first secure communication and the second secure communication are both established simultaneously;
   for each test case of the set of test cases, automatically executing a test case at the test execution environment wherein the test execution environment is one of: the web browser environment or the mobile environment;
   generating a reporting based at least in part on the at least one configuration file; and
   transmitting, via a communication network, the reporting to a recipient.

10. The method of claim 9, wherein the unified driver comprises an integration of a browser testing framework and a mobile testing framework.

11. The method of claim 9, wherein the unified driver set-up accesses client libraries and JAR dependencies to execute the set of test cases.

12. The method of claim 9, wherein the unified driver is integrated with a CI/CD pipeline.

13. The method of claim 9, wherein the testing framework data comprises Behavior-Driven Development (BDD) instructions.

14. The method of claim 9, wherein the reporting comprises feature status and performance.

15. The method of claim 9, wherein the unified driver is managed by a test scheduler.

16. The method of claim 9, wherein the unified driver operates with a test automation engine that routes requests to the test execution environment.

* * * * *